United States Patent
Ebihara

(12)
(10) Patent No.: US 6,396,589 B1
(45) Date of Patent: May 28, 2002

(54) APPARATUS AND METHOD FOR MEASURING THREE-DIMENSIONAL SHAPE OF OBJECT

(75) Inventor: Akimitsu Ebihara, Kyoto (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/527,623

(22) Filed: Mar. 17, 2000

(30) Foreign Application Priority Data

Mar. 17, 1999 (JP) .......................................... 11-072522

(51) Int. Cl.[7] .............................................. G01B 11/24
(52) U.S. Cl. ........................ 356/601; 356/603; 356/607
(58) Field of Search ................................ 356/601, 602, 356/603, 604, 605, 606, 607, 608, 609, 612; 250/559.22

(56) References Cited

U.S. PATENT DOCUMENTS

| | | | |
|---|---|---|---|
| 4,502,785 A | * 3/1985 | Truax | 356/376 |
| 5,668,631 A | 9/1997 | Norita et al. | 356/376 |
| 6,154,279 A | * 11/2000 | Thayer | 356/376 |
| 6,160,615 A | * 12/2000 | Matsui et al. | 356/237.4 |
| 6,181,425 B1 | * 1/2001 | Svetkoff et al. | 356/376 |

FOREIGN PATENT DOCUMENTS

JP          5-332733          12/1993

* cited by examiner

Primary Examiner—Hoa Q. Pham
(74) Attorney, Agent, or Firm—McDermott, Will & Emery

(57) ABSTRACT

A three-dimensional shape measuring apparatus is provided with: an illuminator for illuminating a measurement object by two luminous fluxes in different directions, the two luminous fluxes intersecting each other at a specified position; a light receiver including a plurality of photoelectric conversion elements for receiving light to generate an electric signal in accordance with an intensity of received light; and an objective optical system for transmitting light reflected from the measurement object to the light receiver.

22 Claims, 16 Drawing Sheets

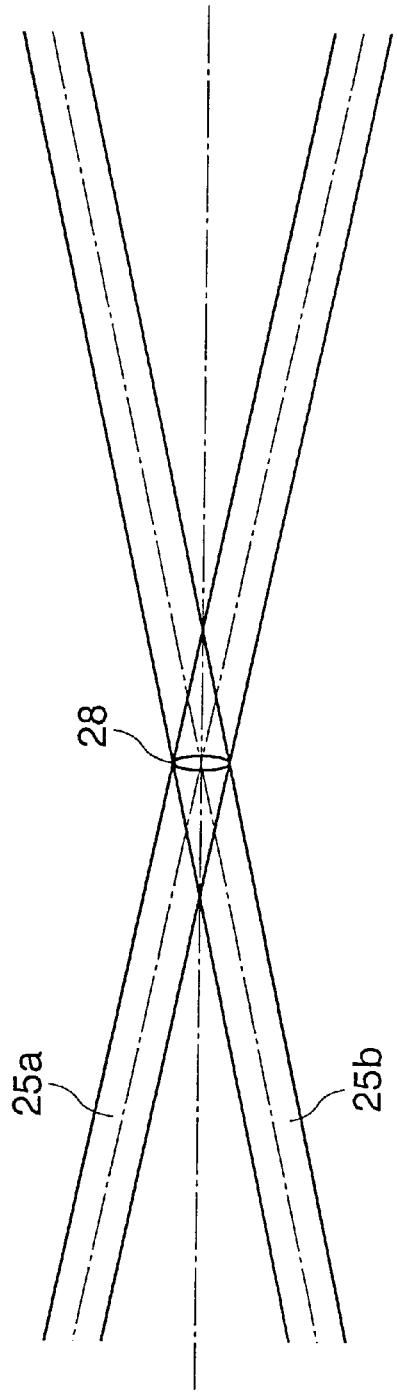
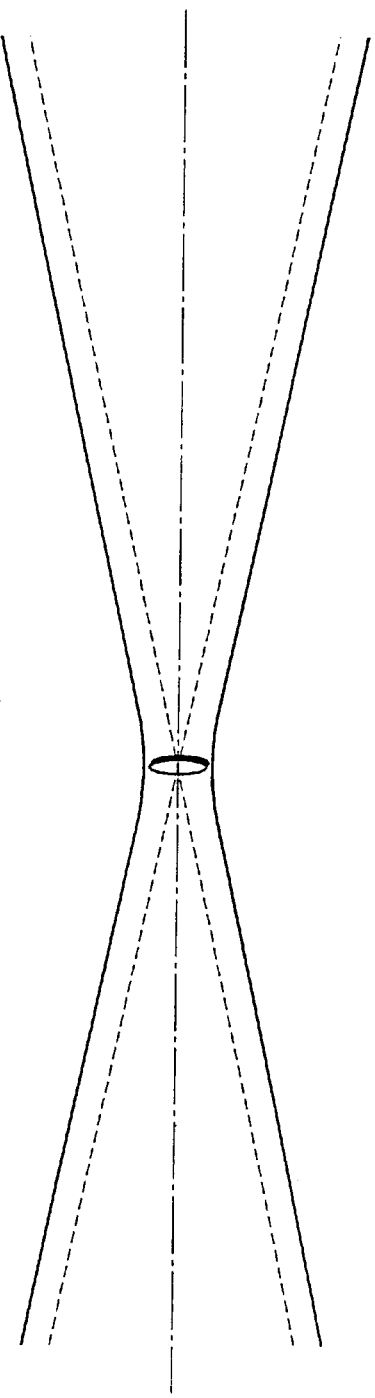

WIDTHWISE DIRECTION OF LUMINOUS FLUX

APPARATUS AND METHOD FOR MEASURING THREE-DIMENSIONAL SHAPE OF OBJECT

This application is based on patent application No. 11-72522 filed in Japan, the contents of which are hereby incorporated by references.

BACKGROUND OF THE INVENTION

This invention relates to an apparatus and method for measuring a three-dimensional shape of an object such as a machine part in a non-contact manner.

Conventionally, optical measuring methods have been known as means for measuring a three-dimensional shape of an object in a non-contact manner. These methods are roughly classified into four categories as follows.

First methods are so-called "light Cutting Method" which adopt the trigonometric measuring method as a basic principle and measure a three-dimensional shape of a measurement object by detecting a direction and a distance from a light projecting section to the measurement object. These methods enable a relatively highly accurate measurement with a simple construction comprised of the light projecting section and a light receiving section. On the other hand, they have disadvantages of a dead spot in measurement depending on the shape of the measurement object and a likeliness to be influenced by the surface condition of the measurement object.

Second methods measure a three-dimensional shape of a measurement object by projecting a specified regular optical pattern to the measurement object and detecting a variation degree of the optical pattern. These methods also have a disadvantage of a large dead spot in measurement despite its advantage of being capable of a highly accurate measurement with a simple construction.

Third methods measure a three-dimensional shape of a measurement object by projecting a ray to a measurement object as a radar does, calculating a distance to the measurement object by calculating a time required for reflected light to reach a light receiving section, and measuring the three-dimensional shape based on the calculated distance and the light projecting position. Although these methods are suited to measuring a long distance, they are not suited to measuring a shape of a small object, such as mechanical parts for a small machine, with high accuracy.

Fourth methods measure a three-dimensional shape of a measurement object by projecting a ray to a measurement object, calculating a distance to the measurement object by detecting a peculiar response of reflected light at a focus of an optical system, and measuring the three-dimensional shape based on the calculated distance and the light projecting position. These methods include a knife-edge method, an astigmatism method, and a confocal method.

The knife-edge method takes advantage of the inversion of, for example, the shadow of the edge of a knife across a focus in a detector. The astigmatism method takes advantage of a change of oval spot light in orientation across a focus using an optical system having an astigmatism.

According to the confocal method, as shown in FIG. 14, a measurement object 100 is moved within a specified range of a focus of a confocal optical system 101, first and second pinholes 102 and 103 are arranged in conjugated positions of the focus, an illumination ray emitted from a light source 104 through the first pinhole 102 is focused by the confocal optical system 101 and projected onto the measurement object 100 to be reflected or diffused, and a ray reflected on the measurement object 100 is caused to transmit through the confocal optical system 101 again and is detected by a light receiving section 105 provided immediately after the second pinhole 103.

Since the fourth methods are based on the change of an optical response which occurs before and after the focus position, measurement can be conducted with a higher resolution as compared with the first to third methods. Further, the confocal method can conduct measurement with a considerably high resolution since the light is most strongly observed in the light receiving section when the surface of the measurement object 100 corresponds with the focus of the confocal optical system 101.

According to the first to third methods, information of shape is obtained when the measurement light reflected on the measurement object is received. On the contrary, according to the fourth methods, shape information cannot be obtained until the measurement object is entirely scanned and a position where the intensity of the measurement light is at maximum is detected. Accordingly, the fourth methods disadvantageously require a longer time than the first to third methods. The fourth methods have additional disadvantages of a complicated optical system and a necessity for a highly precise optical design in order to suppress an aberration to a lower level.

Further, in a conventional confocal detection method shown in FIG. 14, the optical aberration doubly influences in the fourth methods since the light emitted from the light source 104 transmits through the confocal optical system 101, is reflected and diffused on the surface of the measurement object 100, and is received by the light receiving section 105 after transmitting through the confocal optical system 101 again. Therefore, the optical aberration doubly influences.

FIG. 15 shows a light intensity distribution (dotted image distribution) when the light from the light source 104 transmits through the optical system 101 having a certain wave aberration once. FIG. 16 shows a light intensity distribution (dotted image distribution) when the light having transmitted through the optical system 101 is regularly reflected on the measurement object 100 and then transmits through the optical system 101 again, i.e., when the light transmits through the optical system 101 twice. A peak of the dotted image distribution of FIG. 16 is largely lowered as compared to that of FIG. 15. This shows that the image is extremely degraded if the light transmits through the optical system having an aberration.

It has been very difficult to realize an optical system having a high optical performance over an entire range of light when the light transmits through the optical system 101 twice. For example, Japanese Unexamined Patent Publication No. 5-332733 discloses a confocal detection method provided with a confocal optical system. However, since light from a measurement object transmits through the optical system twice, this method also has the aforementioned problem.

Further, in the case that the confocal optical system has a zooming function, an extremely highly precise optical design and a complicated and highly precise optical system are required in order to suppress the optical aberration to a low level over the entire zooming range.

Furthermore, in the confocal optical system 101 used in the conventional confocal detection method shown in FIG. 14, measurement light of various intensities such as specular reflection and diffuse reflection from the surface of the measurement object 100 are incident on the light receiving section 105. Accordingly, the variation range where the intensity of light incident on the light receiving section 105 becomes considerably wide, thereby sometimes exceeding the dynamic range of the light receiving section 105.

SUMMARY OF THE INVENTION

It is an object of the present invention to provide an apparatus and method for measuring a three-dimensional shape of an object which are free of the problems residing in the prior art.

According to an aspect of the present invention, a three-dimensional shape measuring apparatus comprises an illuminator for illuminating a measurement object by two luminous fluxes in different directions. The two luminous fluxes intersect each other at a specified position. The apparatus further comprises a light receiver including a plurality of photoelectric conversion elements for receiving light to generate an electric signal in accordance with an intensity of received light, and an objective optical system for transmitting light reflected from the measurement object to the light receiver.

According to another aspect of the present invention, a three-dimensional shape measuring apparatus comprises: a first measuring system; a second measuring system; a first controller for controlling the first measuring system to obtain first positional data about a measurement object; a measurement region calculator for calculating a measurement range based on obtained first positional data; and a second controller for controlling the second measuring system to obtain second positional data of the measurement object within a calculated measurement region.

According to still another aspect of the present invention, a method for measuring a three-dimensional shape of an object, comprises the steps of: obtaining first positional data of an object at a first measurement accuracy; determining a measurement region based on the obtained first positional data; obtaining second positional data of the object within the determined measurement region at a second measurement accuracy, the second measurement accuracy being higher than the first measurement accuracy; and calculating a three-dimensional shape based on the second positional data.

These and other object, features and advantages of the present invention will become apparent upon reading the following detailed description along with accompanying drawings.

BRIEF DESCRIPTION OF THE DRAWINGS

FIG. 6A is a diagram showing a state where two luminous bands collimated to the order of $\mu$m and projected in two directions by a galvanomirror cross at an intersection;

FIG. 6B is a diagram showing luminous fluxes forming a position of maximum light intensity by focusing;

DETAILED DESCRIPTION OF THE PREFERRED EMBODIMENTS OF THE INVENTION

Figure 1:
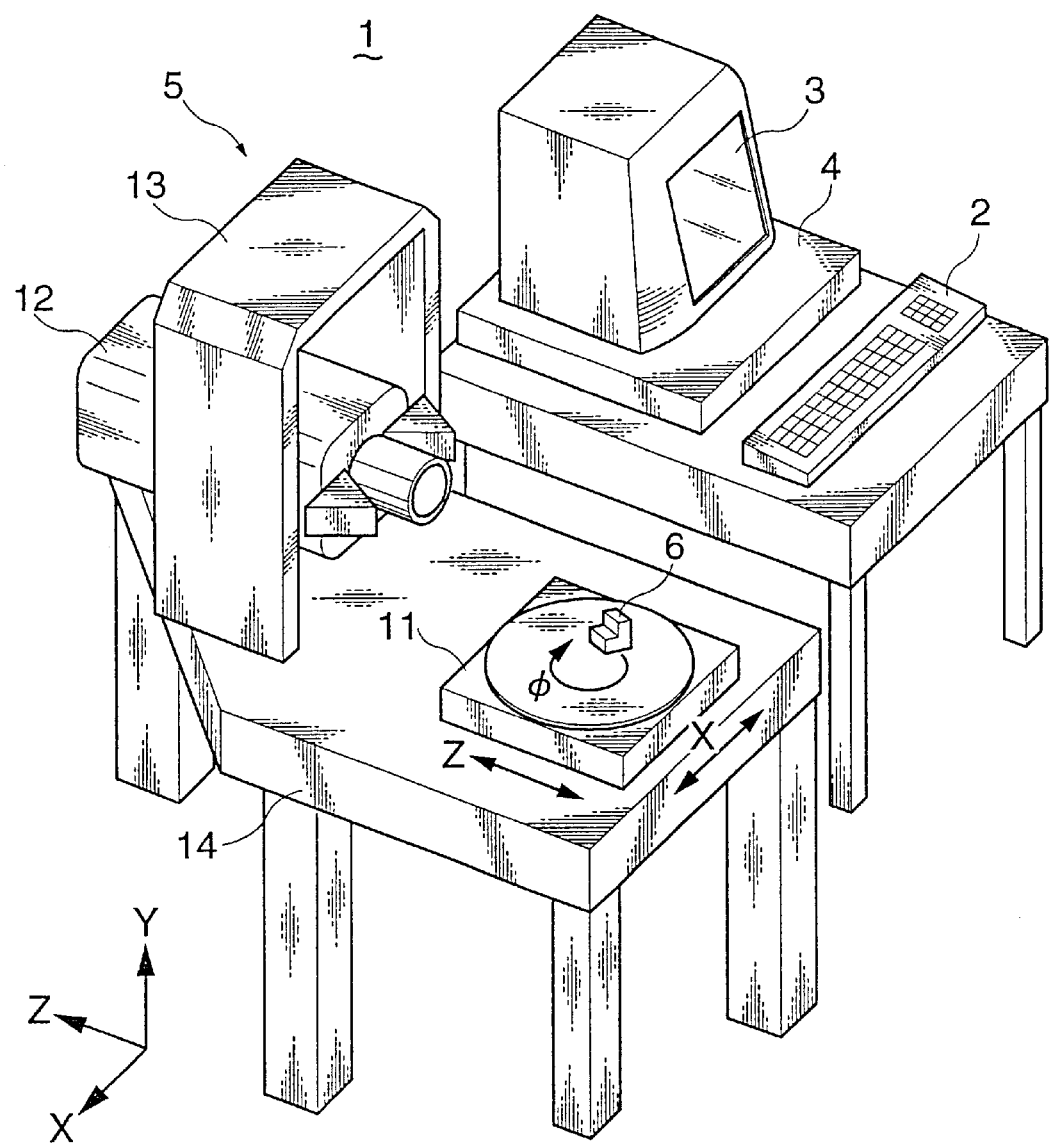
FIG. 1 is a perspective view showing an external configuration of a three-dimensional shape measuring apparatus according to an embodiment of the invention.

FIG. 1 shows an external configuration of a three-dimensional shape measuring apparatus embodying the invention. This measuring apparatus 1 is provided with a keyboard 2 for instructing a measurement start and inputting set data, a display 3 for displaying measurement results and other data, a controller 4 for controlling the entire apparatus 1, and a measuring unit 5. The function of the controller 4 is described later.

The measuring unit 5 is comprised of a table 11 on which a measurement object 6 is placed, a Y-axis driving column 13 for movably supporting a camera unit 12 along Y-axis, and a base 14 on which the table 11 and the driving column 13 are placed. The table 11 is movable along X-axis and Z-axis directions as indicated by arrows in FIG. 1, and is rotatable ($\theta$-direction) about its center. It should be noted that three-dimensional coordinate system (X, Y, Z) is set as shown in FIG. 1.

Figure 2:
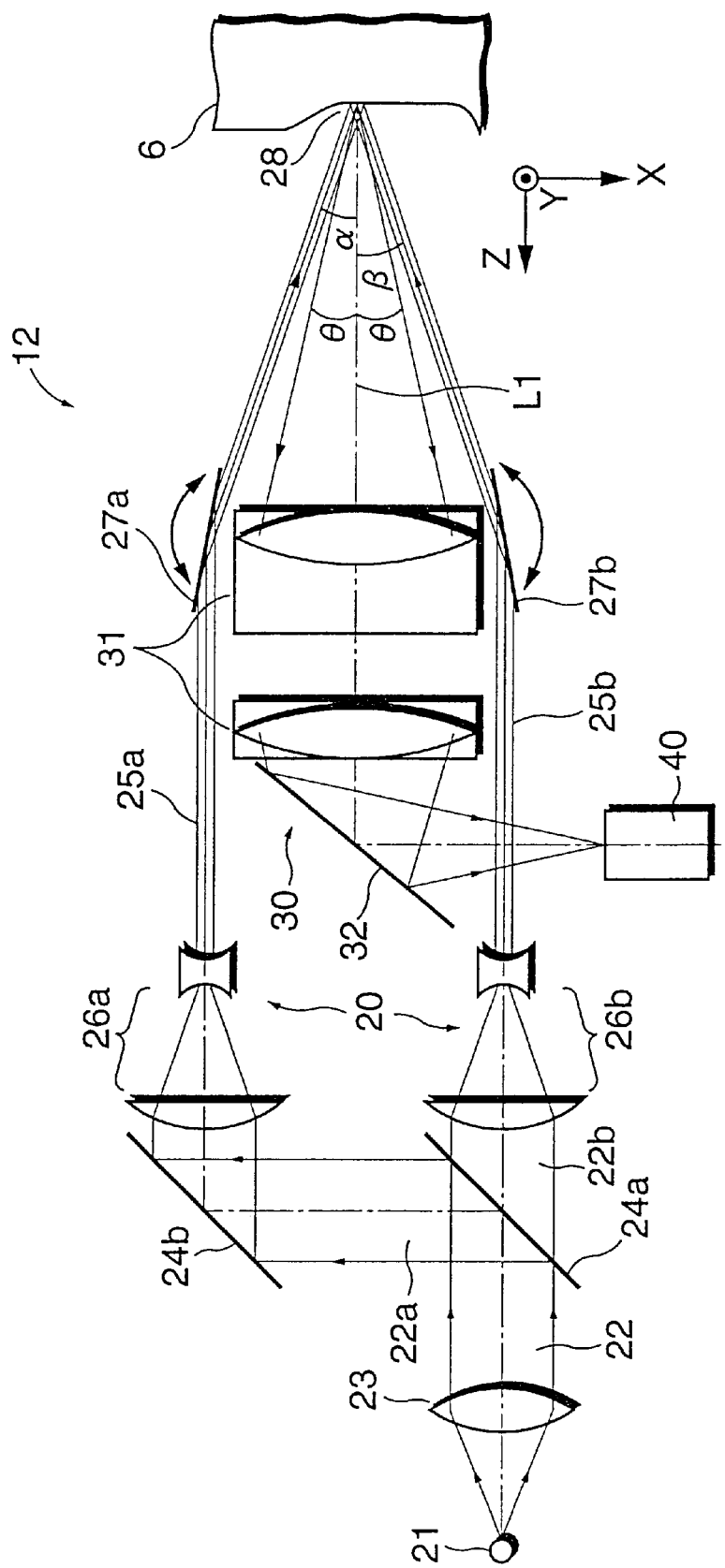
FIG. 2 is a diagram showing an internal construction of camera unit provided in the three-dimensional shape measuring apparatus.
Figure 3:
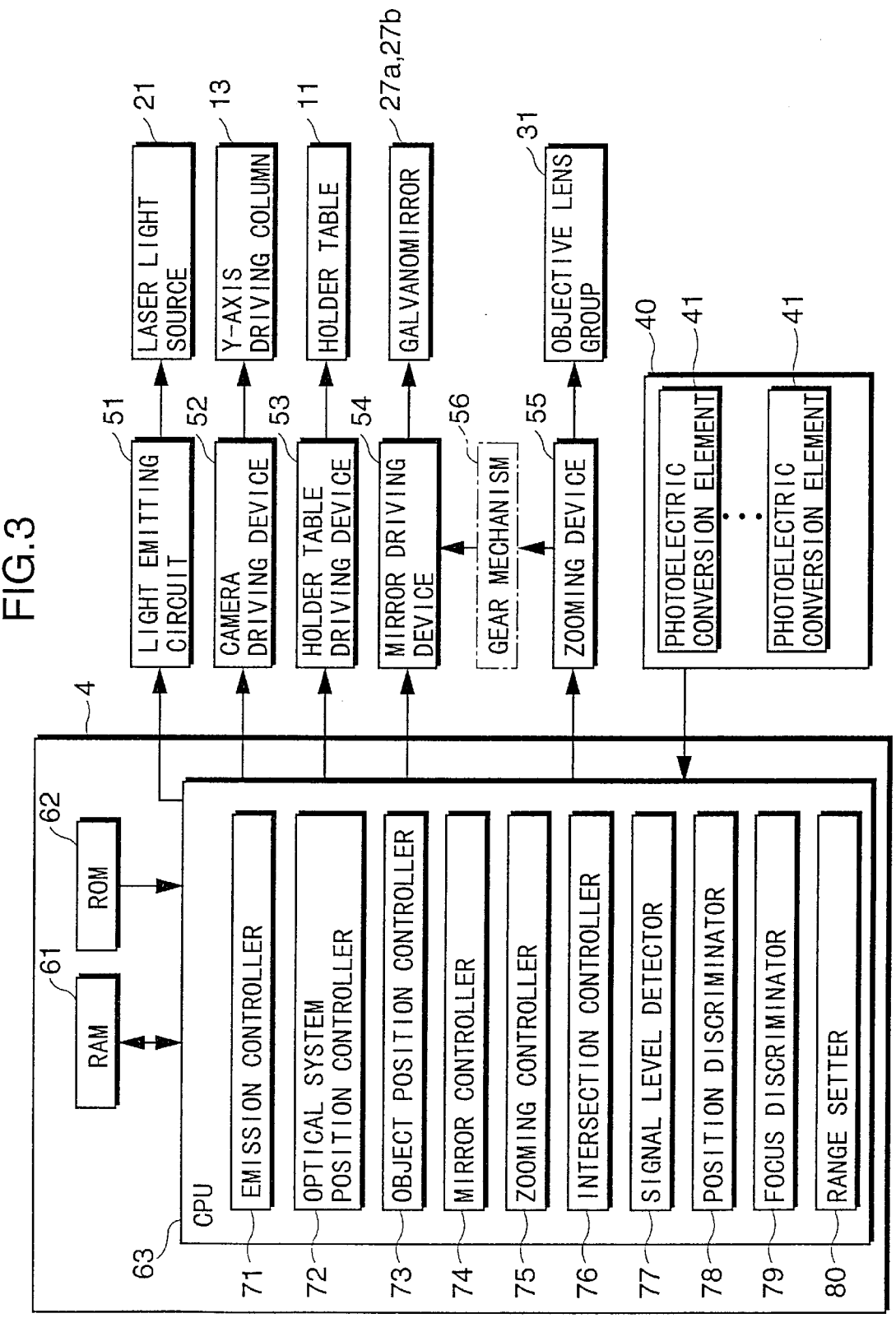
FIG. 3 is a block diagram showing an electrical construction of the three-dimensional shape measuring apparatus.

FIG. 2 shows an internal construction of the camera unit 12, and FIG. 3 is a block diagram showing an electrical construction of the three-dimensional shape measuring apparatus. The camera unit 12 is, as shown in FIG. 2, provided with an illuminator 20, an objective optical system 30 and a light receiver 40.

The illuminator 20 includes a laser light source 21 for emitting a laser beam, a collimator lens 23 for collimating the laser beam into a parallel luminous flux 22, a semitransparent mirror 24a for splitting the parallel luminous flux 22 into two parallel luminous fluxes 22a, 22b, a reflector 24b for reflecting the parallel luminous flux 22a to make it parallel to the parallel luminous flux 22b, Galilean optical systems 26a, 26b for converting the parallel luminous fluxes 22a, 22b into band-shaped collimated luminous fluxes (hereinafter, merely "luminous band") having a fine thickness (e.g., 10 μm in this embodiment), respectively and galvanomirrors 27a, 27b for reflecting the luminous bands to change their propagation directions.

The galvanomirrors 27a, 27b are constructed in link with each other or individually such that their respective angles can be highly accurately changed in the order of microradian. By changing the angles of the galvanomirrors 27a, 27b in link with each other, the position of an intersection 28 of the luminous bands 25a, 25b is transversely (in FIG. 2) movable along the optical axis L1 of the objective optical system 30. It should be noted that the position of the intersection 28 of the luminous bands 25a, 26b normally corresponds with a focus of an object lens group.

The objective optical system 30 includes an object lens group 31 for gathering the measurement light from the measurement object 6 illuminated by the luminous bands 25a, 25b from the illuminator 20, and a reflector 32 for reflecting the light having transmitted through the objective lens group 31, and is telecentric. The objective lens group 31 has a zooming function so that its focus is movable.

Further, the camera unit 12 is so constructed as to satisfy $\theta<\alpha$, $\theta<\beta$ when $\theta$, $\alpha$, $\beta$ denote an angular aperture of the objective optical system 30 (objective lens group 31), a propagation angle of the luminous band 25a with respect to the optical axis L1, and a propagation angle of the luminous band 25b with respect to the optical axis L1, respectively, as shown in FIG. 2. In other words, the camera unit 12 is constructed such that the angular aperture $\theta$ is smaller than the propagation angles $\alpha$, $\beta$ of the luminous bands 25a, 25b.

The light receiver 40 is constructed such that a plurality of photoelectric conversion elements 41 (see FIG. 3) such as CCDs and photodiodes are arrayed in a two-dimensional manner, for example, a line sensor. One column of the photoelectric conversion elements 41 are arranged in a conjugate position of the focus of the objective optical system 30.

In FIG. 3, a light emitting circuit 51 drives a laser light source 21; a camera driving device 52 drives the Y-axis driving column 13; and a table driving device 53 drives the table 11.

A mirror driving device 54 drives the galvanomirrors 27a, 27b so as to link with each other or individually, and a zooming device 55 drives the objective lens group 31 to shift its focus along Z-axis direction.

The controller 4 includes a RAM 61, a ROM 62 and a CPU 63. The RAM 61 is adapted to temporarily store data, and the ROM 62 is adapted to store a control program for the CPU 63 including data set in advance.

The CPU 63 controls the entire operations of the apparatus. As described later, the CPU 63 first performs pre-scanning to measure a schematic shape of the measurement object 6 by the trigonometric measuring method using the luminous band 25a or 25b, and then shifts the focus of the objective optical system 30 to perform focus-scanning for accurately measuring the shape of the measurement object 6. The CPU 63 has the following functions.

(1) Function as an emission controller 71 for controlling the emission of the laser light source 21 via the light emitting circuit 51.

(2) Function as an optical system position controller 72 for controlling the position of the camera unit 12 with respect to Y-axis direction via the camera driving device 52.

(3) Function as an object position controller 73 for controlling the position of the measurement object 6 with respective to X-axis and Y-axis directions via the table driving device 53.

(4) Function as a mirror controller 74 for individually controlling the angles of the galvanomirrors 27a, 27b via the mirror driving device 54.

(5) Function as a zooming controller 75 for moving the focus of the objective lens group 31 along Z-axis direction via the zooming device 55.

(6) Function as an intersection controller 76 for controlling such that the position of the intersection 28 of the luminous bands 25a, 25b corresponds with the focus of the objective lens group 31 by changing the angles of the galvanomirrors 27a, 27b by means of the mirror driving device 54 as the zooming device 55 is driven.

(7) Function as a signal level detector 77 for detecting the level of an electric signal outputted from the photoelectric conversion elements 41 of the light receiver 40 having received the measurement light from the measurement object 6 when the luminous bands 25a, 25b are projected to the measurement object 6.

(8) Function as a position discriminator 78 for discriminating the position of the outer surface of the measurement object 6 in the direction of the optical axis L1 of the objective optical system 30 by the trigonometric measuring method based on an angle of the luminous band 25a or 25b with respect to the optical axis L1 and the positions of the photoelectric conversion elements 41 having received the measurement light from the measurement object 6 when the luminous band 25a or 25b is projected to the measurement object 6. The operation by this function is described later.

(9) Function as a focus discriminator 79 for discriminating the position of the intersection 28 when the level of the electric signal outputted from the photoelectric conversion elements 41 of the light receiver 40 having received the measurement light from the measurement object 6 when the intersection 28 of the luminous bands 25a, 25b and the focus of the objective lens group 31 are shifted along the direction of the optical axis L. The operation by this function is described later.

(10) Function as a range setter 80 for setting a movable range of the intersection 28 of the luminous bands 25a, 25b in the direction of the optical axis L1 when the focus discriminator 79 makes a discrimination based on the discrimination result of the position discriminator 78.

As indicated by phantom line in FIG. 3, a gear mechanism 56 for linking the zooming device 55 and the mirror driving device 54 only when the zooming device 55 is driven may also be provided, so that the mirror driving device 54 is also driven when the focus of the objective lens group 31 is shifted, thereby causing the position of the intersection 28 of the two luminous bands 25a, 25b to correspond with the focus of objective lens group 31. In this case, the CPU 63 needs not have its function as the intersection controller 76.

In the above construction, the table driving device 53 and the table 11 construct a relative moving device and an object moving device. The mirror driving device 54 and the galvanomirrors 27a, 27b construct an object moving device. The mirror driving device 54 and the galvanomirrors 27a, 27b construct an intersection moving device. The zooming device 55 constructs a zooming device.

When the focus of the objective optical system 30 is shifted in the focus-scanning, the position of the intersection 28 of the luminous bands 25a, 25b is so shifted as to correspond with this focus. Accordingly, "scanning of the focus of the objective optical system 30" means the same action as "scanning of the intersection 28 of the two luminous bands 25a, 25b" in the description below.

Next, the action of the optical system constructed as shown in FIGS. 2 and 3 is described. A laser beam emitted from the laser light source 21 is collimated into a parallel luminous flux 22, which is split in two directions by the semitransparent mirror 24a. The split luminous fluxes are converted into luminous bands 25a, 25b by the Galilean optical systems 26a, 26b and oriented to the galvanomirrors 27a, 27b. When the angles of the galvanomirrors 27a, 27b are individually changed, the respective angles of the luminous bands 25a, 25b with respect to the optical axis L1 of the objective optical system 30 are changed. If the angles of the galvanomirrors 27a, 27b are changed in association with each other, the position of the intersection 28 of the two luminous bands 25a, 25b is shifted on the optical axis Ll. The measurement light from the measurement object 6 illuminated by the luminous bands 25a, 25b is incident on the light receiver 40 via the objective optical system 30.

Since the angular aperture θ of the objective optical system 30 is smaller than the propagation angles α, β of the luminous bands 25a, 25b with respect to the optical axis L, the specular reflection on the measurement object 6 (0-order light) is hardly incident on the objective optical system 30, but only the diffuse reflection is incident thereon.

This has the same effects as those obtained when an optical bypass filter is used, i.e., low-frequency components of the reflection from the surface of the measurement object 6 are blocked and only the light intensity of high-frequency components is taken by the light receiver 40. This narrows the intensity variation range of the light incident on the light receiver 40 due to a difference in the reflection characteristics of the surface of the measurement object 6. Thus, the variation range does not exceed the dynamic range of the photoelectric conversion elements 41, with the result that measurement objects 6 having various surface shapes can be measured.

Figure 4:
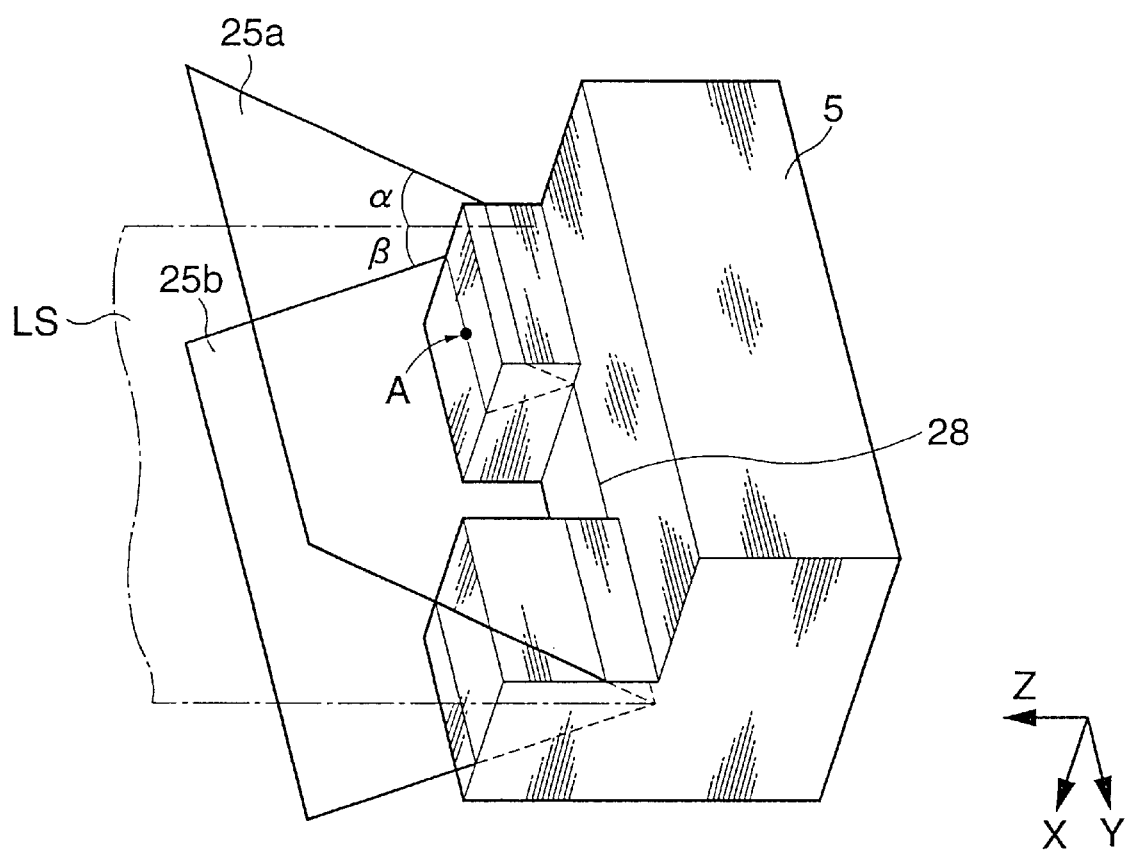
FIG. 4 is a perspective view showing two luminous bands and a measurement object to explain pre-scanning.
Figure 5:
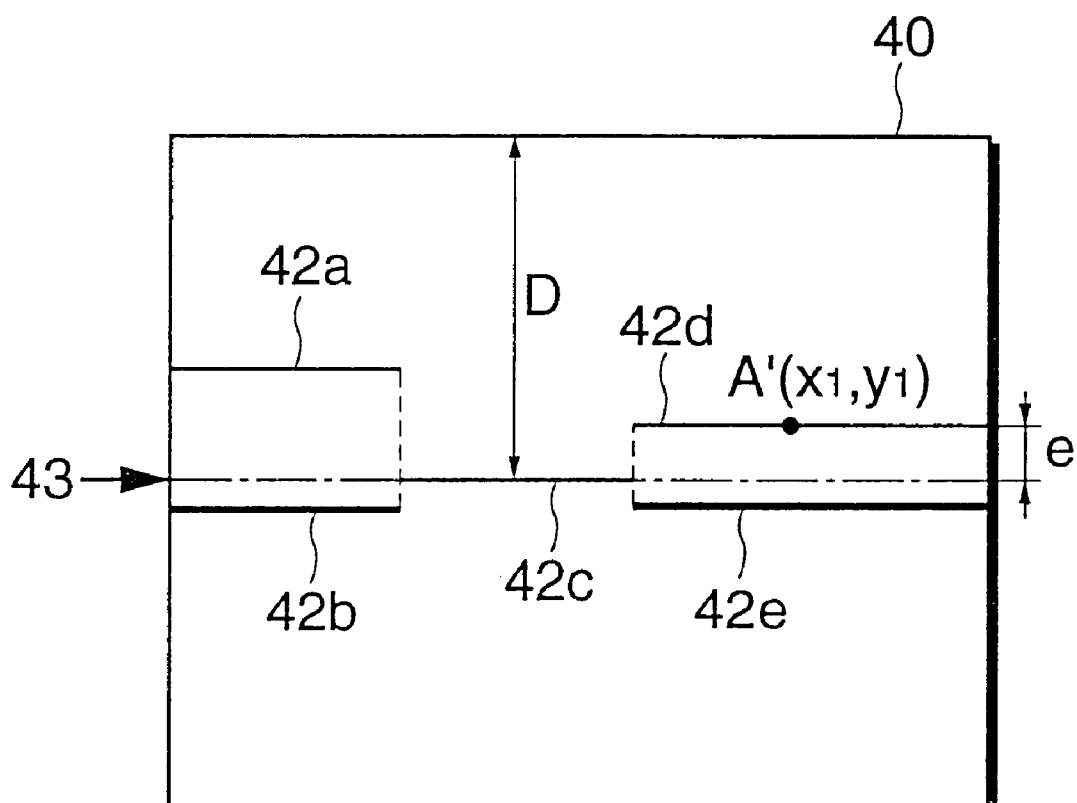
FIG. 5 is a diagram showing a two-dimensional light image in a light receiver.

Next, a shape measuring operation in the pre-scanning is described with reference to FIGS. 4 and 5. FIG. 4 is a perspective view showing the two luminous bands 25a, 25b and the measurement object 6 for explaining pre-scanning, and FIG. 5 is a diagram showing a two-dimensional light image in the light receiver 40. When the two luminous bands 25a, 25b are projected to the measurement object 6 in two directions at angles α, β with respect to an optical axis plane LS to illuminate the measurement object 6 as shown in FIG. 4, diffuse reflections 42a, 42b, 42d, 42e are observed by the light receiver 40 as shown in FIG. 5. Here, if a position of the two-dimensional light image of the light receiver 40 corresponding to the intersection 28 of the two luminous bands 25a, 25b is represented by a reference line 43, the position of the reference line 43 (e.g., dimension D in FIG. 5) is known.

For example, coordinates (x, y, z) of an illumination position A of the luminous band 25b on the measurement object 6 shown in FIG. 4 are obtained as follows. Coordinates (x1, y1) of diffuse reflection A' is obtained based on the two-dimensional light image observed by the light receiver 40, and a distance e between the reference line 43 and the diffuse reflection A' is obtained as shown in FIG. 5. Assuming that H, β denote a z-coordinate of the intersection 28 of the luminous bands 25a, 25b and a propagation angle of the luminous band 25b as shown in FIG. 4, the coordinates (x, y, z) of the illumination position A are obtained in accordance with Equation (1)

$$(x, y, z) = (x1, y1, e \cdot \cot\beta + H) \tag{1}$$

The shape of the measurement object 6 is measured by successively obtaining the coordinates of the observed diffuse reflection while the table 1 is driven to move the measurement object 6 in a direction perpendicular to an intersection line formed by the intersection 28, i.e., along X-axis direction. Based on this measurement result, a focus-scanning range (e.g., ±50 μm along Z-axis direction from the surface of the measurement object 6 in this embodiment) is set.

If the two luminous bands 25a, 25b are simultaneously projected to the measurement object 6 in the pre-scanning, the diffuse reflections 42a, 42b, 42c, 42d, 42e are simultaneously observed as shown in FIG. 5. Accordingly, it is necessary to discriminate by which luminous band the diffuse reflection from the measurement object 6 is produced. This can be judged if the angle of one of the galvanomirrors 27a, 27b is changed until one luminous band goes beyond the two-dimensional light image of the light receiver 40, so that only the diffuse reflections by the other luminous band are on the two-dimensional light image.

The measurement pitch of the pre-scanning depends on the propagation angles of the two luminous bands 25a, 25b, the magnification of the light receiver 40, and the size of each of the photoelectric conversion elements 41. In this embodiment, the camera unit 12 is so constructed as to ensure a measurement pitch of, e.g., in the order of ten to hundred μm. The measurement pitch of the pre-scanning or the interval between measurement points is set at any larger value unless exceeding an expected focus-scanning range. This is because the pre-scanning is performed not to obtain fine data concerning a shape of a measurement object, but to determine a measurement range for the focus-scanning. Accordingly, the pre-scanning can be completed in a shorter time.

The positions on the surface of the measurement object 6 can be obtained by changing the respective angles of the galvanomirrors 27a, 27b such that the measurement object 6 can be scanned in the two-dimensional image of the light receiver 40 in the pre-scanning. Thus, the focus scanning range including the surface of the measurement object 6 can be determined.

Further, since the two luminous bands 25a, 25b are projected to the measurement object 6 in two directions, the "eclipse" caused by the shape of the measurement object 6 can be reduced. In other words, even if the "eclipse" occurs to one of the luminous bands 25a, 25b, the shape of the measurement object 6 can be measured unless it occurs to the other luminous band. Accordingly, dead spots in shape measurement can be reduced.

Further, since the measurement object 6 generally have various side surfaces, it is difficult to measure the entire shape by one-direction scanning. However, since the table 11 is rotatable in θ-direction in this embodiment, the side surface of the measurement object 6 can be measured at various angles, thereby reducing the number of dead spots in measurement.

Further, the larger the propagation angles α, β of the luminous bands 25a, 25b, the higher the measurement accuracy, and the higher the density of the photoelectric conversion elements 41 of the light receiver 40, the higher the measurement accuracy. Thus, the measurement time of the focus-scanning can be shortened.

If the measurement object 6 is located beyond the field of view of the camera unit 2, the shape of the measurement object 6 can be measured by successively moving the table 11 along X-axis and Z-axis directions.

Next, a measuring operation for the focus-scanning is described with reference to FIGS. 2, 6 to 9. In FIG. 2, in the focus-scanning, the position of the intersection 28 of the two luminous bands 25a, 25b and the focus of the objective optical system 30 are successively shifted by a predetermined micro distance in a horizontal sectional direction of the measurement object 6, i.e., in a direction of the optical axis L1 (Z-axis direction) within the scanning range determined by the pre-scanning, and the diffuse reflections from the surface of the measurement object 6 in respective positions are received by the light receiver 40.

Figure 7:
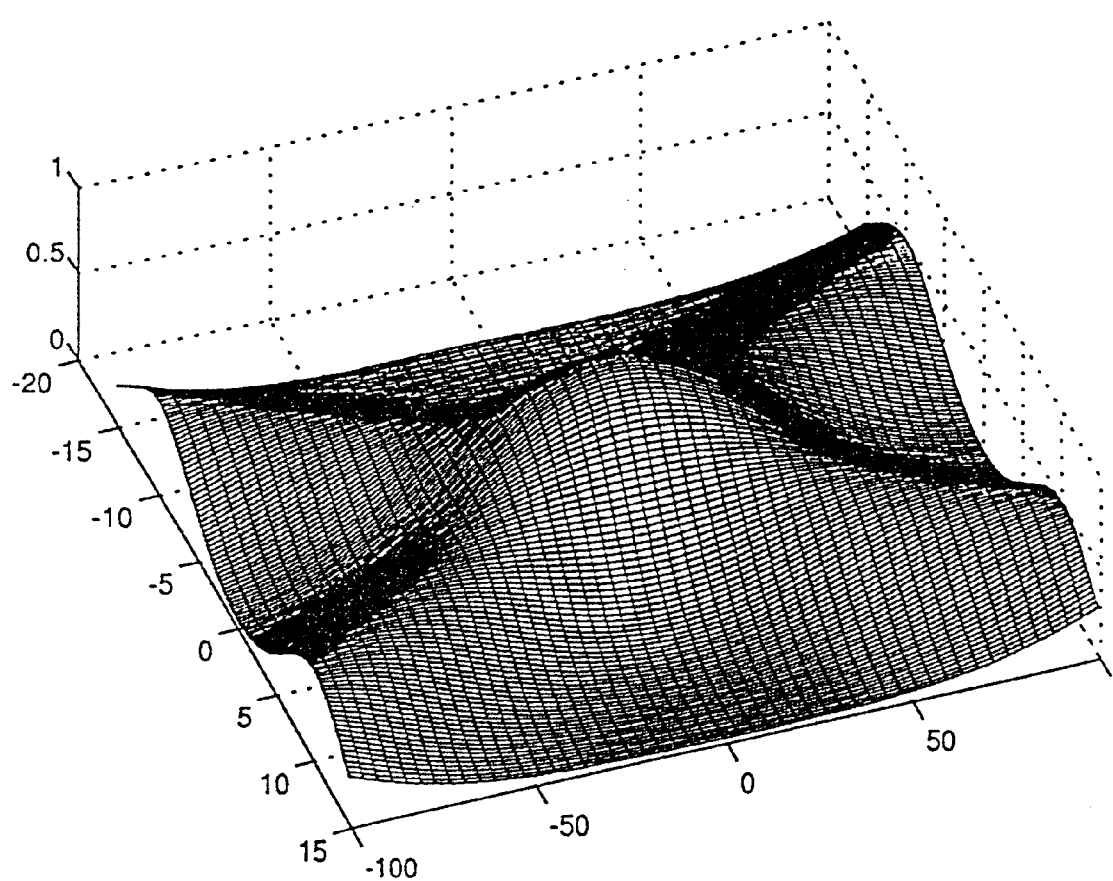
FIG. 7 is a graphical representation showing a simulation result of a light intensity distribution near the intersection.

FIG. 6A shows a state where the two luminous bands 25a, 25b collimated to a thickness of in the order of $\mu$m are projected in two directions by the galvanomirrors 27a, 27b (see FIG. 2) and intersect at the intersection 28. FIG. 7 is a graphical representation showing a light intensity distribution near the intersection 28. It can be seen from FIG. 7 that the light intensity is at maximum at the intersection 28 of the two luminous bands 25a, 25b.

The position of the intersection 28 can be arbitrarily shifted in a three-dimensional space by controlling the respective angles of the galvanomirrors 27a, 27b with a precision of the order of micro-radian. In this case, since a change in the position of the intersection 28 brings about no change in aberration, the light intensity distribution will not change.

Generally speaking, if a zoom lens is used in a conventional confocal optical system forming a position of the maximum light intensity by focusing as shown in FIG. 6B, an aberration characteristic changes as the position of the focus changes, with the result that the light intensity distribution in the receiver changes.

On the contrary, in this embodiment, the two luminous bands 25a, 25b constantly having the same light intensity distribution are projected to the measurement object 6 and the measurement light from the measurement object 6 transmits through the objective optical system 30 only once. Thus, an overall aberration can be reduced as compared with the prior art, thereby improving the measurement accuracy.

Although the illuminator 20 for projecting the luminous bands to the measurement object 6 and the objective optical system 30 for receiving the measurement light from the measurement object 6 are separated in this embodiment, a pseudo confocal optical system having substantially the same function as the conventional confocal optical system is constructed.

Referring back to FIG. 2, only electric signals outputted from one row of the photoelectric conversion elements 41 (see FIG. 3) of the light receiver 40 (for example, a row corresponding with the reference line 43 shown in FIG. 5) arranged in parallel with the line formed by the intersection 28 of the two luminous bands 25a, 25b and in a conjugated position of the focus of the objective optical system 30 are used as measurement data for the three-dimensional shape measurement. Thus, there can be obtained the same effect as the confocal effect that a slit is arranged immediately before the light receiver and the diffuse reflection having a maximum intensity is incident on the light receiver when the surface of the measurement object 6 is in focus.

The electric signals of one row of the photoelectric conversion elements 41 outputted from the light receiver 40 are stored in the RAM 61 after being A/D converted. When the measurement in the determined scanning range is completed, a curve representing a focus-light intensity relationship is obtained based on the data stored in the RAM 61, and an in-focus position can be known from a position of a maximum value. This position represents a position on the surface of the measurement object 6. Upon completion of the measurement of one section, the measurement object 6 is moved along X-axis direction by the predetermined micro distance and the measurement for the next section is similarly performed.

Figure 8:
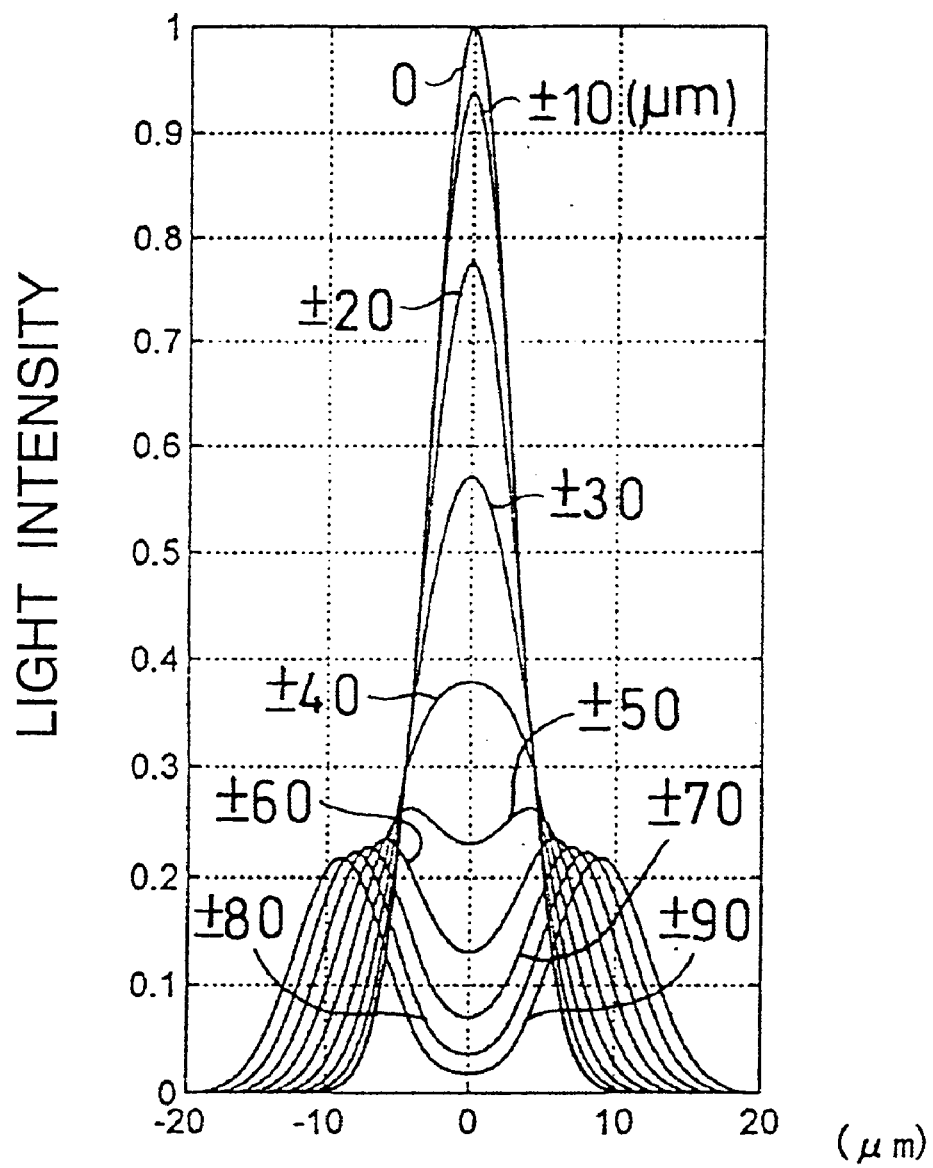
FIG. 8 is a graph showing a simulation result of a variation of the light intensity distribution along the widthwise direction of the luminous flux observed when the intersection is scanned in a range of $-90$ $\mu$m to $90$ $\mu$m along a direction of an optical axis L1 (Z-axis direction) from the outer surface of a measurement object.
Figure 9:
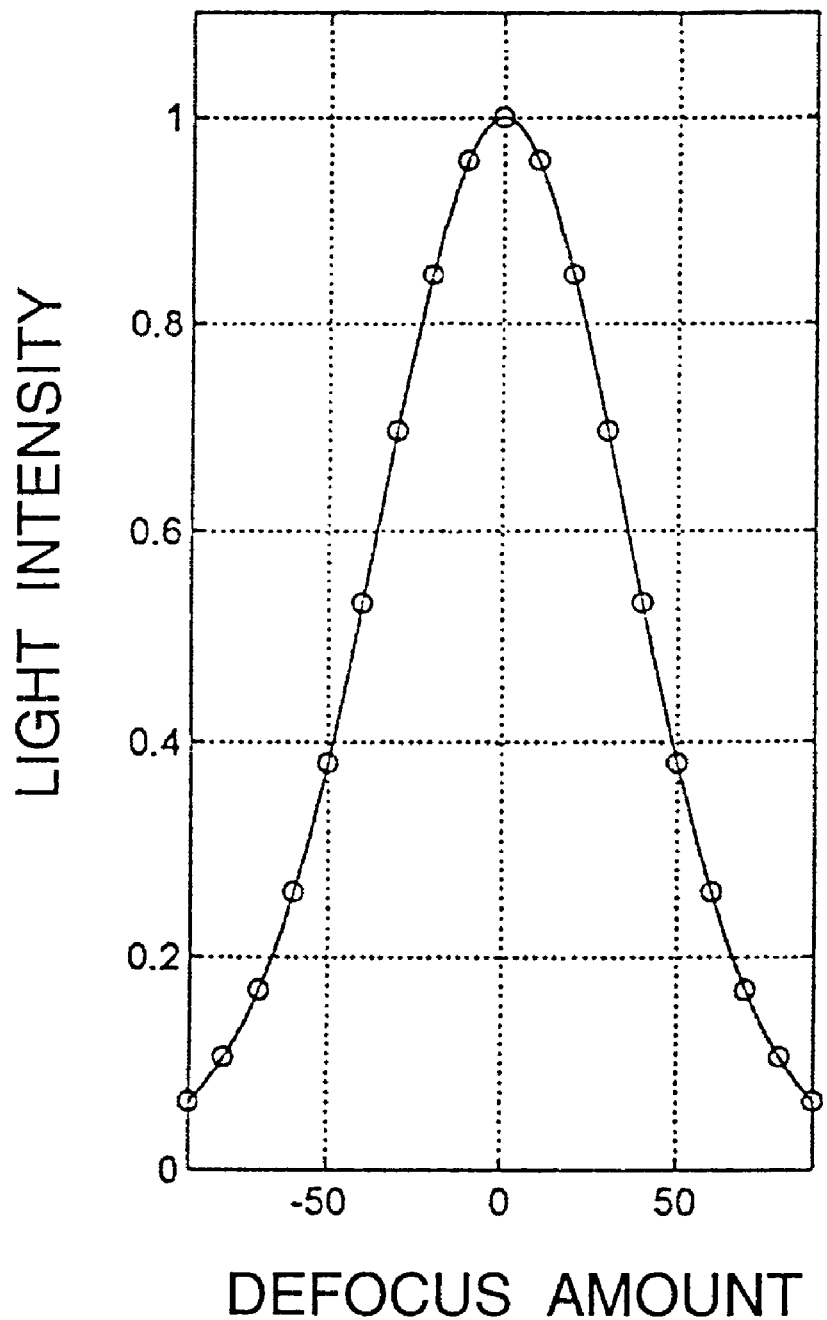
FIG. 9 is a graph showing a simulation result of a variation of a light intensity signal in relation to a defocus amount from an outer surface of a measurement object which is observed when CCD pixels having a width of 10 $\mu$m are used as photoelectric conversion elements under the same conditions as in FIG. 8.

FIG. 8 is a graph showing a simulation result of a variation of the light intensity distribution with respect to the widthwise direction of the luminous flux which is observed when the position of the intersection 28 is shifted over a range of −90 $\mu$m to 90 $\mu$m from the surface of the measurement object 6 along the direction of the optical axis L1 (Z-axis direction). In this graph, a numerical aperture of the objective optical system 30 is set at 0.1, the thickness of the luminous bands 25a, 25b is set at 10 $\mu$m, and the light intensity is normalized to 1. FIG. 9 is a graph showing a simulation result of a variation of a light intensity signal with respect to a defocus amount from the surface of the measurement object 6 of which variation is observed when CCD pixels having a width of 10 $\mu$m are used as the photoelectric conversion elements 41 under the same conditions as in FIG. 8.

As shown in FIGS. 8 and 9, when the collimated luminous bands 25a, 25b are intersected, the intersection 28 acts as a pseudo focus, with the result that a variation of the light intensity signals caused by a focus shift can be obtained as in the conventional confocal optical system. This enables a shape measurement of high accuracy.

As described above, since measurement is performed only in the scanning range determined based on the measurement result obtained by the pre-scanning, the measurement time can be shortened and the capacity of the RAM 61 necessary to store the measurement data from the photoelectric conversion elements 41 can be reduced. In this embodiment, the camera unit 2 is so constructed as to ensure a measurement pitch of, e.g., 0.5 to 10 $\mu$m.

Figure 10:
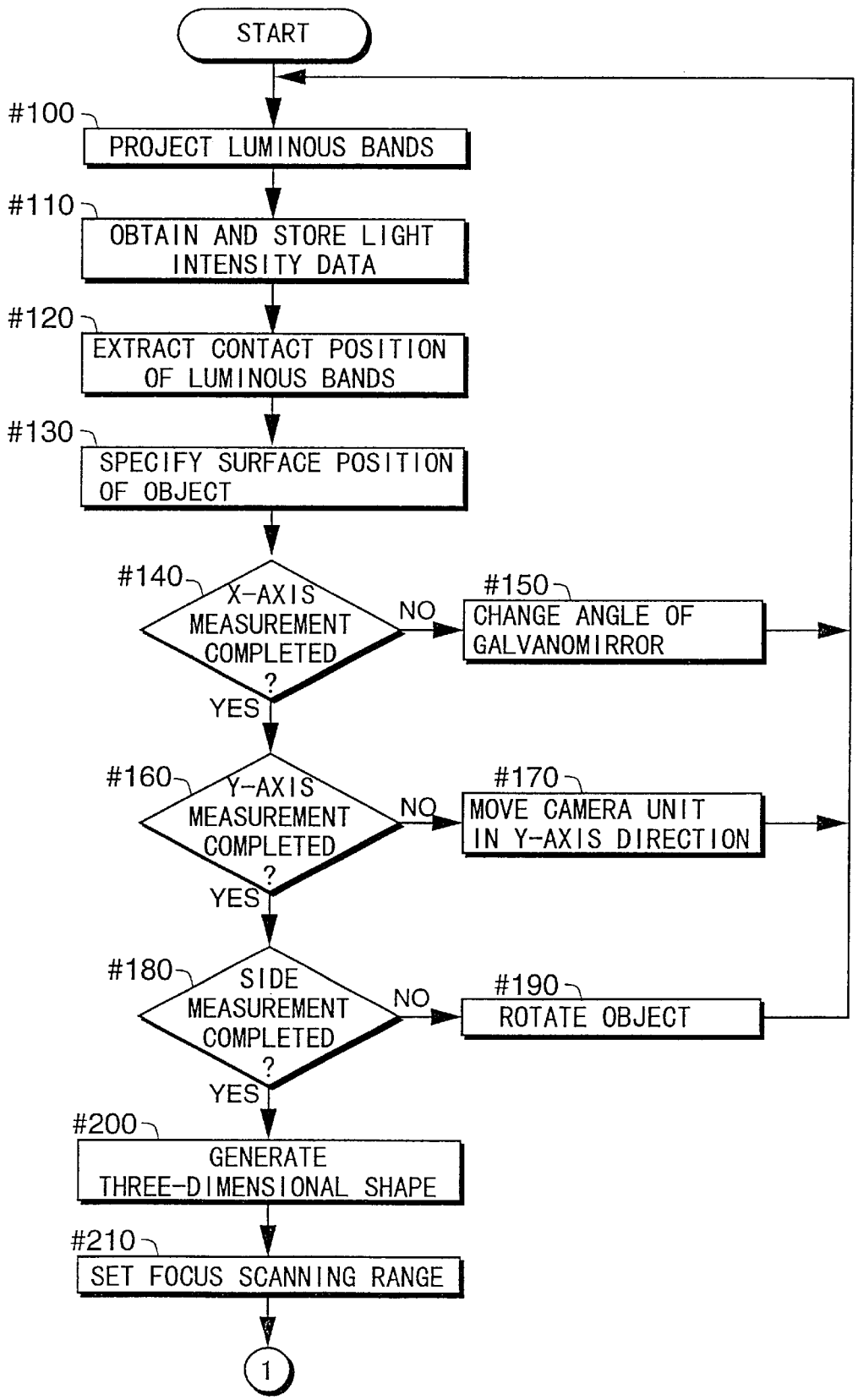
FIGS. 10 and 11 are a flowchart showing a measuring operation of the apparatus.
Figure 11:
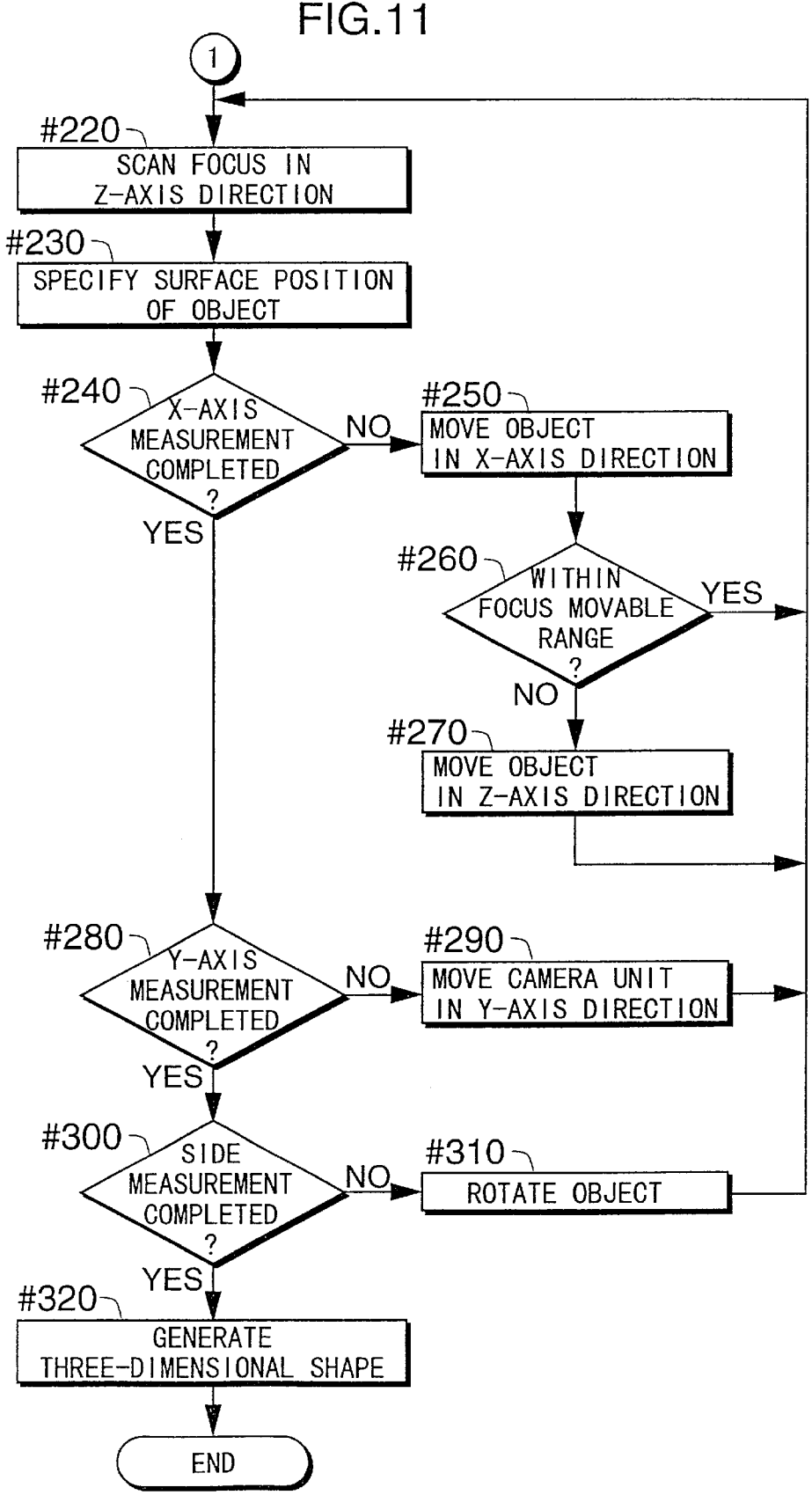

Next, referring back to FIG. 2, a sequence of measuring operations performed by this apparatus is described in accordance with a flowchart of FIGS. 10 and 11. In the flowchart of FIGS. 10 and 11, Steps #100 to #210 show a procedure for the pre-scanning and Steps #220 to #320 show a procedure for the focus-scanning.

First, the two luminous bands 25a, 25b are projected (Step #100), and the light intensity data represented by the measurement light from the measurement object 6 is obtained via the light receiver 40 and stored in the RAM 61 (Step #110). Projected positions of the luminous bands 25a, 25b in the two-dimensional light image are found from the light intensity data (Step #210), and the surface position of the measurement object 6 is specified by the trigonometric calculation based on the projected positions (Step #130).

Subsequently, it is judged whether the measurement along X-axis direction has been completed (Step #140). Unless this measurement has been completed (NO in Step #140), the angles of the galvanomirrors 27a, 27b are changed by specified angles (Step #150) and this routine returns to Step #100.

On the other hand, if the measurement along X-axis direction has been completed (YES in Step #140), it is judged whether the measurement along Y-axis direction has been completed (Step #160). If this measurement has not yet been completed (NO in Step #160) because the measurement object 6 is larger than the width of the luminous bands 25a, 25b along Y-axis direction, the camera unit 2 is moved to an unmeasured area along Y-direction (Step #170) and this routine returns to Step #100.

On the other hand, if the measurement along Y-axis direction has been completed (YES in Step #160), it is judged whether the side of the measurement object 6 has been completely measured (Step #180). Unless this measurement has been completed (NO in Step #180), the measurement object 6 is rotated by a specified angle (Step #190) and this routine returns to Step #100. If, on the other hand, the measurement of the side has been completed (YES in Step #180), a three-dimensional shape of the measurement object 6 is generated by a coordinate transform or the like to measure a schematic shape of the measurement object 6 (Step #200). Subsequently, the range for focus-scanning is determined using this measurement result (Step #210). In this way, the pre-scanning is performed at the relatively large measurement pitch by the trigonometric measuring method. Thus, the pre-scanning can be performed at a higher speed.

The focus-scanning follows the pre-scanning. First, the focus is scanned in Z-axis direction only within the determined scanning range to obtain the light intensity data in the respective positions, which data are then stored in the RAM 61 (Step #220). Subsequently, a maximum value of the light intensity data is found to specify the surface position of the measurement object 6 (Step #230).

Subsequently, it is judged whether the measurement along X-axis direction has been completed (Step #240). Unless this measurement has been completed (NO in Step #240), the measurement object 6 is moved along X-axis direction by a specified distance (Step #250). It is then judged whether the scanning range in this X-coordinate lies within the focus movable range of the object lens group 31 (Step #260). If this scanning range lies within the focus movable range (YES in Step #260), this routine returns to Step #220. On the other hand, if the judgment in Step #260 is negative, the measurement object 6 is moved along Z-axis direction until the above scanning range comes to lie within the focus movable range (Step #270) and this routine returns to Step #220.

On the other hand, if the measurement along X-axis direction has been completed (YES in Step #240), it is judged whether the measurement along Y-axis direction has been completed (Step #280). If this measurement has not yet been completed (NO in Step #280), the camera unit 2 is moved to an unmeasured area along Y-direction (Step #170) and this routine returns to Step #220.

On the other hand, if the measurement along Y-axis direction has been completed (YES in Step #280 ), it is judged whether the sides of the measurement object 6 have been completely measured (Step #300). Unless this measurement has been completed (NO in Step #300), the measurement object 6 is rotated by a specified angle (Step #310) and this routine returns to Step #220.

If, on the other hand, the measurement of the sides has been completed (YES in Step #300), a three-dimensional shape is generated by merging the measurement data by a coordinate transformation or the like (Step #310). In this way, the focus-scanning is performed at the smaller measurement pitch over the limited scanning range determined by the pre-scanning. Accordingly, a shape of the measurement object 6 can be obtained more accurately in a shorter time.

The present invention is not limited to the foregoing embodiment, but may be embodied as follows.

(1) Although the laser beam from the laser light source 21 is split into two beams using a beam splitter 24a as shown in FIG. 2 in the foregoing embodiment, two laser light sources may be used instead of using the beam splitter 24a.

In such a case, the two laser light sources are alternately turned on and off and the light intensity data are obtained from the light receiver 40 in synchronism with the turning-on and off of the light sources. In this way, which of the two luminous bands 25a, 25b has produced the light intensity data in the two-dimensional image can be judged.

(2) Although the angles of the galvanomirrors 27a, 27b are changed for the pre-scanning and the focus-scanning in the foregoing embodiment, a measurement can be similarly conducted even if the measurement object 6 is scanned in Z-axis direction with the galvanomirrors 27a, 27b fixed.

Figure 12:
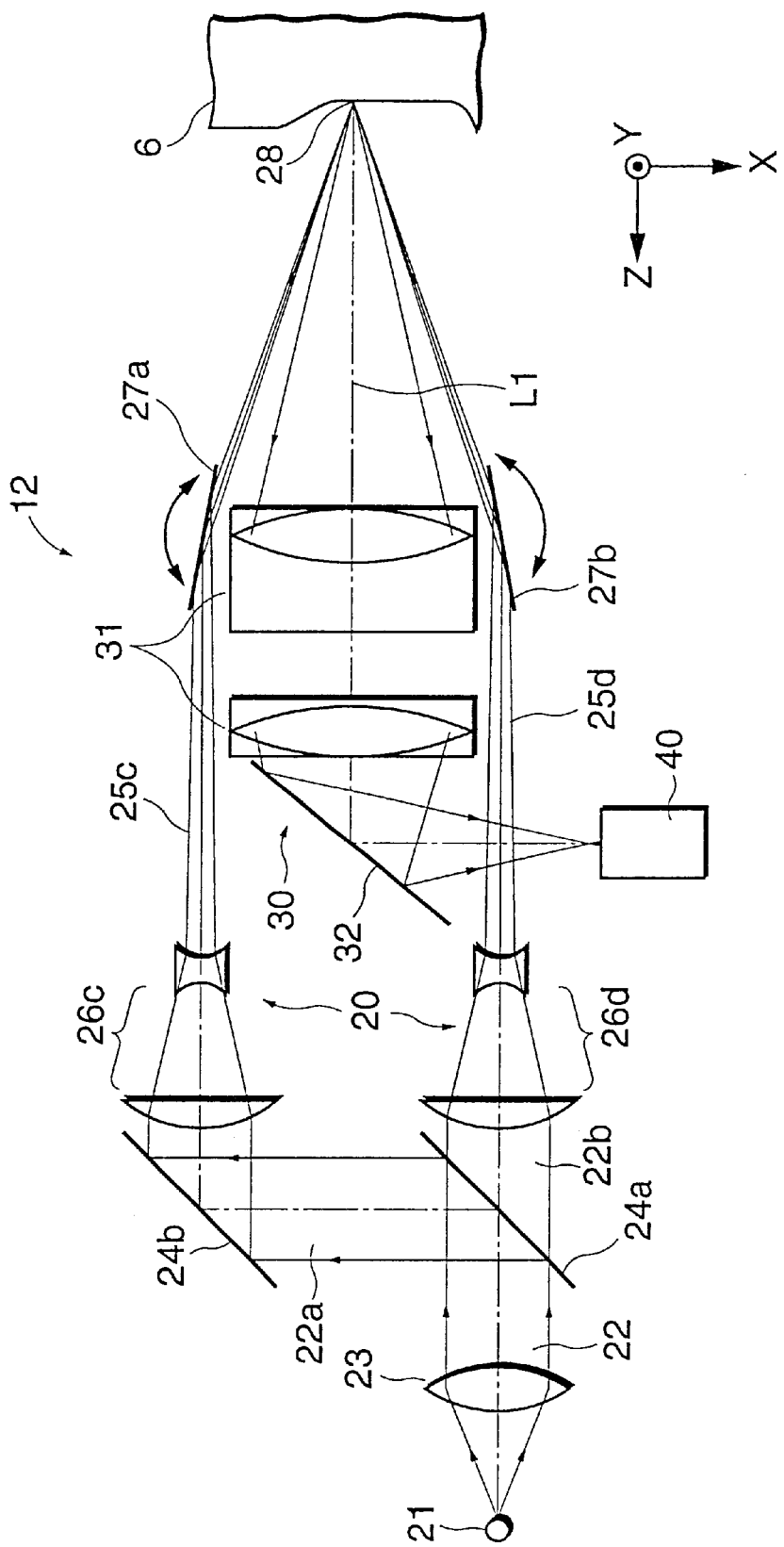
FIG. 12 is a diagram showing a modification of the camera unit.

(3) A modification of the camera unit 2 which is shown in FIG. 12 may be used. It should be noted that in FIG. 12, the same elements as those in FIG. 2 are identified by the same reference numerals. In this modification, optical systems 26c, 26d having a very smaller numerical aperture are provided instead of the Galilean optical systems 26a, 26b of FIG. 2.

The optical systems 26c, 26d orient collimated luminous fluxes 22a, 22b to the galvanomirrors 27a, 27b after converting them into luminous bands 25c, 25d converged to a very small thickness (for example, in the order of 10 $\mu$m in this modification). The optical systems 26c, 26d are set such that the luminous bands 25c, 25d are most focused near the intersection 28.

According to this modification, even if it is difficult to produce collimated luminous bands, a measurement can be conducted with the same accuracy as in the case where the collimated luminous bands are used by constructing the camera unit 12 such that a distance between the galvanomirrors 27a, 27b and the measurement object 6 is sufficiently longer than the scanning range of the intersection 28.

Figure 13:
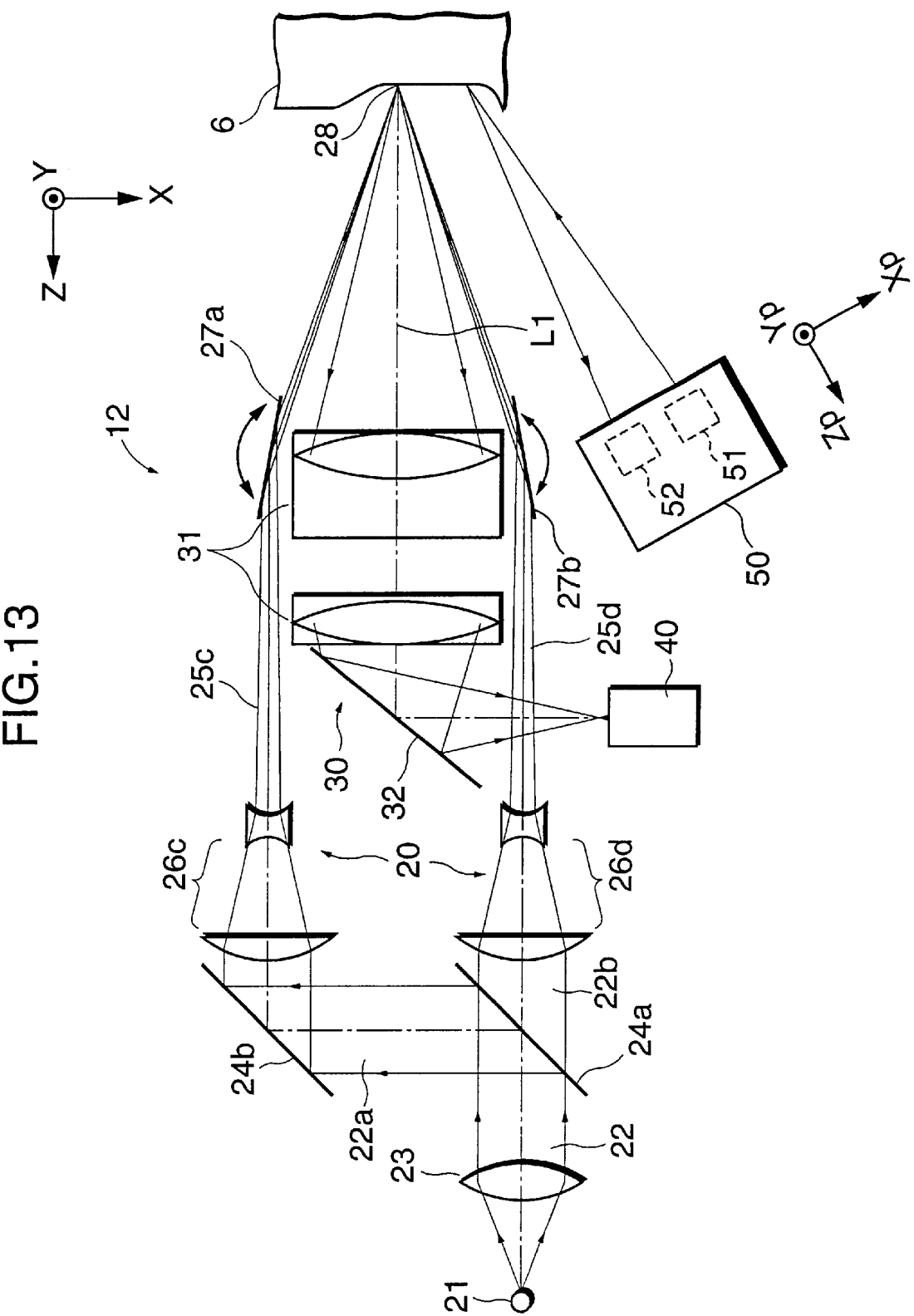
FIG. 13 is a diagram showing another modification of the camera unit.
Figure 14:
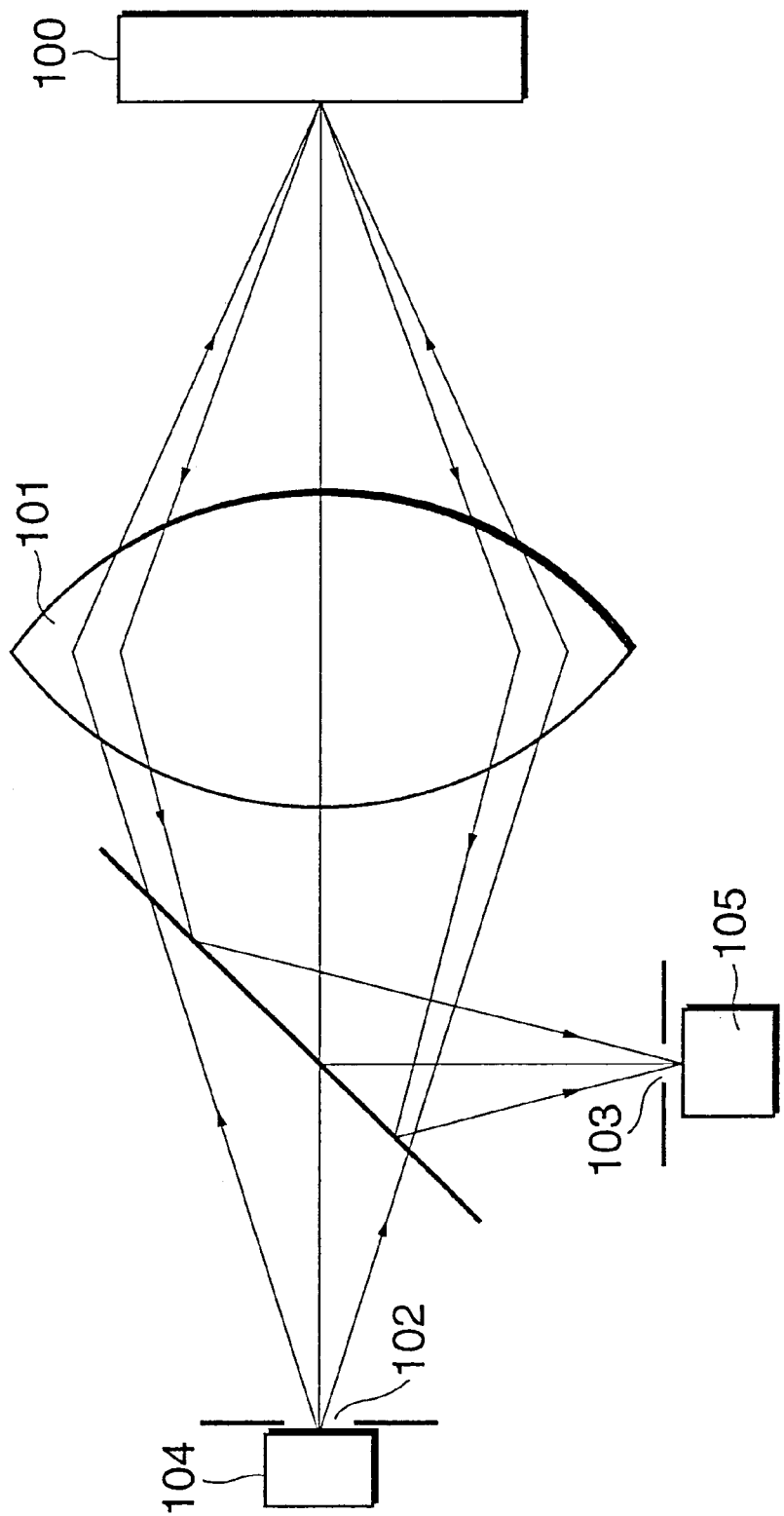
FIG. 14 is a construction diagram of a conventional confocal optical system.
Figure 15:
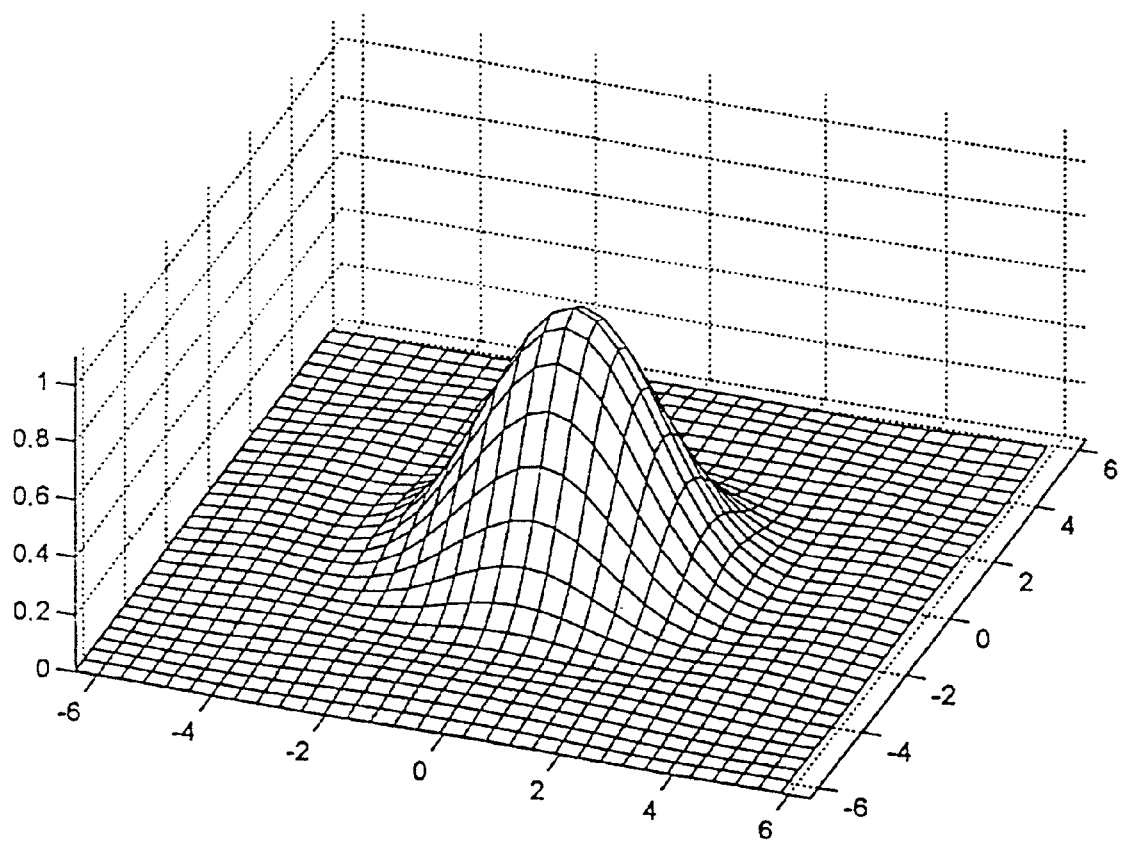
FIG. 15 is a graph showing the intensity of light from a spot light source when it transmits through an optical system having a certain wave aberration.
Figure 16:
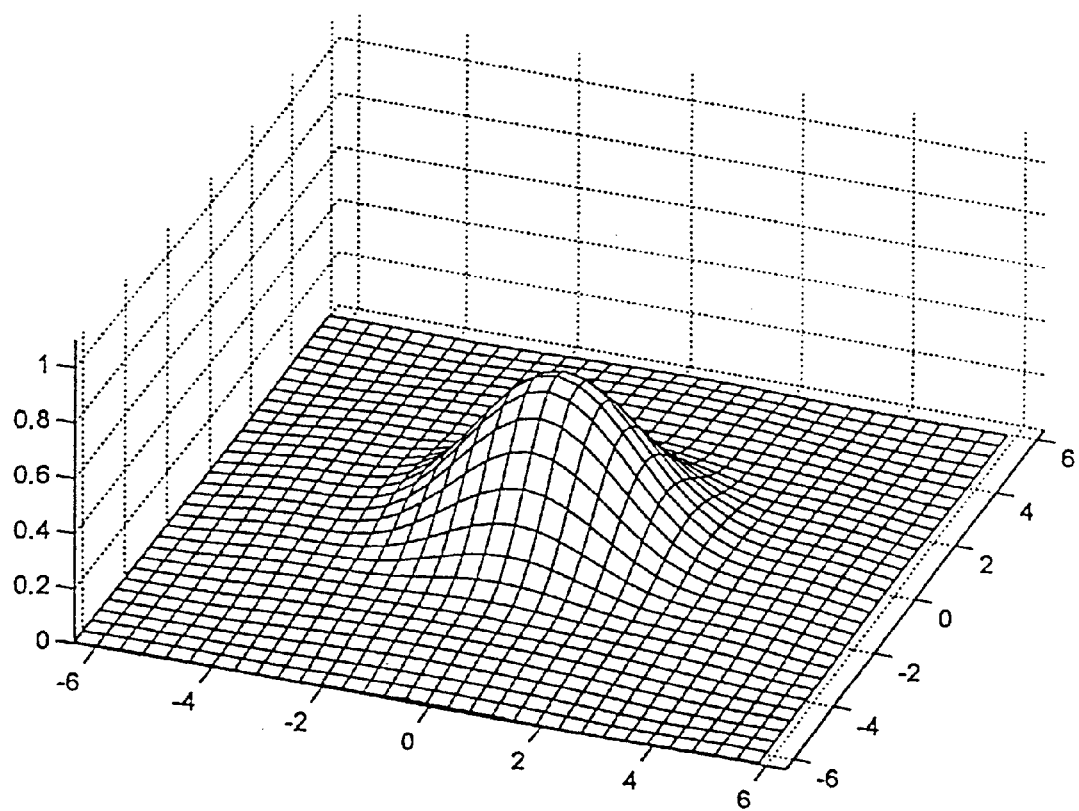
FIG. 16 is a graph showing the intensity of light from a spot light source when the light has transmitted through an optical system having a certain wave aberration, been regularly reflected and transmitted through the same optical system again.

(4) Another modification of the camera unit 2 which is shown in FIG. 13 may be used. This modification is basically similar to that shown in FIG. 12. Specifically, optical systems 26c, 26d having a very smaller numerical aperture are provided instead of the Galilean optical systems 26a, 26b of FIG. 2.

In the foregoing camera units shown in FIGS. 2 and 12, the pre-scanning and the focus-scanning are performed by the use of the same optical and sensing system. However, in the modification shown in FIG. 13, there is provided a pre-scanning device 50 independently of the optical and sensing system for focus-scanning. The pre-scanning device 50 includes an illuminator 51 for projecting a light beam onto a measurement object 6, and a light receiver 52 for receiving light reflected from the measurement object 6 to generate measurement data. The light receiver 52 is provided with a number of photoelectric conversion elements arranged in a two-dimensional manner.

On the other hand, there is provided a light receiver 40' for the focus-scanning, which is provided with a greater number of photoelectric conversion elements arranged in a two-dimensional manner, e.g., a line sensor, similarly to those of FIGS. 2 and 12. However, the photoelectric conversion element density of the light receiver 40' is higher than that of the light receiver 52. This is because the pre-scanning to determine a scanning range for the focus-scanning need not fine measurement, but the focus-scanning needs fine measurement.

A sequence of measuring operations using this modified camera unit will be basically similar to that shown in FIGS. 10 and 11 except for necessity of coordinate transformation prior to Step #210 where a focus-scanning range is determined. This will be seen from the fact that in this modification, the optical and sensing system for pre-scanning is provided in a different position from the optical and sensing system for focus-scanning.

The coordinate transformation is performed as follows. It is assumed, as shown in FIG. 13, that the pre-scanning optical and sensing system has a three-dimensional coordinate system (Xp, Yp, Zp) and the focus-scanning optical and sensing system has a three-dimensional coordinate system (X, Y, Z). A coordinate value Vp in the coordinate system (Xp, Yp, Zp) is transformed into a coordinate value V in the coordinate system (X, Y, Z) in accordance with Equation (2)

$$V = T \cdot Vp \quad (2)$$

Specifically, the coordinate value Vp is expressed in Equation (3):

$$Vp = \begin{bmatrix} Xp \\ Yp \\ Zp \\ 1 \end{bmatrix} \quad (3)$$

The coordinate transformation matrix T is expressed in Equation (4):

$$T = \begin{bmatrix} R & H \\ 0 & 1 \end{bmatrix} \quad (4)$$

wherein R denotes a matrix for rotation, i.e., $R=R(\theta x) R(\theta y) R(\theta z)$, and H denotes a matrix for translation, i.e., $H=[x\ y\ z]$. The coordinate value V is expressed in Equation (5):

$$V = \begin{bmatrix} X \\ Y \\ Z \\ 1 \end{bmatrix} \quad (5)$$

(5) As a modification of the camera unit 12 shown in FIGS. 2 and 12, it may be appreciated to provide a secondary light receiver in addition to the light receiver 40, and a beam splitter prior to the light receiver 40 for orienting the light transmitted through the objective lens group 31 onto the secondary light receiver. The secondary light receiver is provided with a light sensor having less photoelectric conversion element density than the light receiver 40. The light receiver 40 and the secondary light receiver are used in accordance with measurement purpose. For example, the secondary light receiver is used for the pre-scanning while the light receiver 40 is used for the focus-scanning.

(6) Although the two luminous bands 25a, 25b are used in the foregoing embodiments, two narrow luminous fluxes intersecting with each other may be used and an intersection thereof may be shifted, for example, in Y-axis direction of FIG. 2. In this case, three or more narrow luminous fluxes may be used.

As described above, a measurement object is illuminated by two luminous fluxes emitted in different directions from an illuminator and intersected at a specified position, and measurement light from an illuminated measurement object transmits through an objective optical system and is received by a number of photoelectric conversion elements arranged in a two-dimensional manner, which then output electric signals corresponding to the intensity of the received light. Since the illuminator and the objective optical system are separated and the two luminous fluxes transmit through the objective optical system only once, the influence of the aberration of the objective optical system can be reduced.

Further, since the two luminous fluxes for illuminating the measurement object are collimated, the intensity characteristics of the measurement light received by the light receiver can be stabilized, which improves the measurement accuracy.

Since the two luminous fluxes for illuminating the measurement object are focused near the specified position where they intersect, the intensity of the measurement light received by the light receiver is high when the measurement object is illuminated near the specified position, thereby improving the measurement accuracy.

The position of the surface of the measurement object in the direction of the optical axis of the objective optical system is judged based on the propagation angle of one of the two luminous fluxes with respect to the optical axis when the measurement object is illuminated only by this one luminous flux and the positions of the photoelectric conversion elements of the light receiver having received the measurement light. Thus, the shape of the measurement object can be easily measured according to the trigonometric measuring method.

The surface of the measurement object can be suitably covered by the two luminous fluxes by relatively shifting the position of the intersection of the two luminous fluxes and the position of the measurement object along the optical axis of the objective optical system. Thus, the shape of the measurement object can be suitably measured.

The surface of the measurement object can be easily covered by the two luminous fluxes by moving the measurement object along the optical axis of the objective optical system. Thus, the shape of the measurement object can be suitably measured.

The intersecting angle is changed by changing the propagation directions of the two luminous fluxes to shift the position of the intersection along the optical axis of the objective optical system. Thus, even if the measurement object is heavy, the outer surface of the measurement object can be quickly covered by the two luminous fluxes, with result that the shape of the measurement object can be suitably measured.

The two luminous fluxes for illuminating the measurement object are in the form of bands, thereby producing a linear intersection. Thus, the time required for the measurement of the shape of the measurement object can be shortened by two-dimensionally receiving the measurement light band from the measurement object by the light receiver.

The measuring apparatus is constructed such that the position of the intersection of the two luminous fluxes corresponds with the focus of the objective optical system. Thus, if the surface of the measurement object also corresponds with this position of correspondence, the level of the measurement light transmitting through the objective optical system is at maximum, which enables the surface position of the measurement object to be easily detected.

Further, an angular aperture of the objective optical system is made smaller than the propagation angle of the two luminous fluxes with respect to the optical axis of objective optical system. Thus, only the diffuse reflection is incident into the objective optical system eliminating most of the specular reflection from the measurement object. Thus, a variation range of the intensity of the incident light on the light receiver can be narrowed, and the electric signals corresponding to the intensity of the received light can be suitably outputted from the light receiver.

Furthermore, at least a part of the plurality of photoelectric conversion elements are arranged in positions conjugated with the focus of the objective optical system, and the intensity of the measurement light is detected using the electric signals outputted from the photoelectric conversion elements in the conjugated positions. Thus, if the surface of the measurement object also corresponds with the position where the position of the intersection of the two luminous fluxes and the focus of the objective optical system correspond with each other, the intensity of the measurement light transmitting through the objective optical system is at maximum, which enables the surface position of the measurement object to be easily detected with high accuracy.

The position of the intersection is shifted along the optical axis of the objective optical system by changing the propagation directions of the two luminous fluxes, and the focus of the objective optical system is shifted along the optical axis by the zooming device so that the focus of the objective optical system corresponds with the position of the intersection. Thus, the electric signals outputted from the photoelectric conversion elements change according to the surface position of the measurement object. Therefore, the surface position of the measurement object can be easily detected.

Further, the position of the intersection where the signal of the detector is at maximum is detected while the position of the intersection of the two luminous fluxes is shifted along the optical axis. The position of the intersection at this time corresponds with the surface of the measurement object. Thus, the surface position of the measurement object can be easily detected with high accuracy.

Furthermore, the two luminous fluxes for illuminating the measurement object are in the form of bands, respectively, thereby producing a linear intersection extending in a direction normal to the optical axis of the objective optical system. Thus, if the surface of the measurement object also corresponds with the position where the position of the intersection of the two luminous fluxes and the focus of the objective optical system correspond with each other, the measurement light band from the measurement object is linearly received by the light receiver, enabling the simultaneous measurements at a plurality of points. Therefore, a time required for the measurement of the shape of the measurement object can be shortened.

Further, the measurement object is moved in a direction normal to both the intersection line formed by the intersection of the two luminous bands and the optical axis of the objective optical system. Thus, the positions in the wide outer surface of the measurement object can be efficiently detected, enabling a suitable measurement of the three-dimensional shape of the measurement object.

Furthermore, the position of the surface of the measurement object in the direction of the optical axis of the objective optical system is detected based on the propagation angle of one of the two luminous fluxes with respect to the optical axis of the objective optical system when the measurement object is illuminated only by this one luminous flux and the positions of the photoelectric conversion elements of the light receiver having received the measurement light. By determining the relative movable range for the position of the intersection of the two luminous fluxes and the position of the measurement object based on the above detection result, a highly accurate shape measurement can be conducted only within the relative movable range. Therefore, a measurement time can be shortened while ensuring a highly accurate shape measurement.

As this inventive apparatus may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to embraced by the claims.

What is claimed is:

1. A three-dimensional shape measuring apparatus comprising:
    an illuminator for illuminating a measurement object by two luminous fluxes in different directions, the two luminous fluxes intersecting each other at a specified position;
    a light receiver including a plurality of photoelectric conversion elements for receiving light to generate an electric signal in accordance with an intensity of received light; and
    an objective optical system for transmitting light reflected from the measurement object to the light receiver,
    the illuminator illuminating the measuring object to obtain positional data of the measuring object at a first accuracy, and the objective optical system being used to obtain positional data of the measuring object at a second accuracy, with the second accuracy being higher than the first accuracy.

2. A three-dimensional shape measuring apparatus according to claim 1, wherein the two luminous fluxes each are collimated.

3. A three-dimensional shape measuring apparatus according to claim 1, wherein the two luminous fluxes converge near the specified position where they intersect.

4. A three-dimensional shape measuring apparatus according to claim 1, wherein the plurality of photoelectric conversion elements are arranged in a two-dimensional configuration.

5. A three-dimensional shape measuring apparatus according to claim 4, further comprising a position judger for judging a position of a surface of the measurement object in the direction of an optical axis of the objective optical system based on the propagation angle of one of the two luminous fluxes with respect to the optical axis when the measurement object is illuminated only by the one luminous flux, and a light receiving position on the photoelectric conversion elements of the light receiver having received light reflected from the measurement object.

6. A three-dimensional shape measuring apparatus according to claim 5, wherein the specified position where the two luminous fluxes intersect each other is shifted in a specified direction.

7. A three-dimensional shape measuring apparatus according to claim 5, wherein the measurement object is moved in a specified direction.

8. A three-dimensional shape measuring apparatus according to claim 1, wherein the two luminous fluxes each have the form of a band, whereby producing a linear intersection.

9. A three-dimensional shape measuring apparatus according to claim 1, wherein the specified intersection position corresponds with the focus of the objective optical system.

10. A three-dimensional shape measuring apparatus according to claim 9, wherein the angular aperture of the objective optical system is smaller than the propagation angle of the two luminous fluxes with respect to the optical axis of objective optical system.

11. A three-dimensional shape measuring apparatus according to claim 10, wherein the light receiver includes a line of photoelectric conversion elements lying in a position conjugated with the focus of the objective optical system.

12. A three-dimensional shape measuring apparatus according to claim 11, further comprising a focus shifter for shifting the focus of the objective optical system along the optical axis; and a position judger for judging a position of a surface of the measurement object based on a focus position of the objective optical system which permits the photoelectric conversion elements to generate a maximal electric signal.

13. A three-dimensional shape measuring apparatus according to claim 11, further comprising:

an object carrier for moving the measurement object in the direction of the optical axis of the objective optical system; and a position judger for judging a position of a surface of the measurement object based on a position of the measurement object which permits the photoelectric conversion elements to generate a maximal electric signal.

14. A three-dimensional shape measuring apparatus according to claim 9, wherein the two luminous fluxes each have the of a band, whereby producing a linear intersection extending in a direction normal to the optical axis of the objective optical system.

15. A three-dimensional shape measuring apparatus according to claim 14, further comprising an object carrier for moving the measurement object in a direction normal to both the intersection line formed by the intersection of the two luminous bands and the optical axis of the objective optical system.

16. A three-dimensional shape measuring apparatus according to claim 1, further comprising:

a position judger for judging a position of an outer surface of the measurement object in the direction of the optical axis of the objective optical system based on the propagation angle of at least one of the two luminous fluxes with respect to the optical axis of the objective optical system when the measurement object is illuminated only by the one luminous flux, and a position of the photoelectric conversion elements of the light receiver having received light reflected from the measurement object;

a relative movement mechanism for causing a relative movement between the focus of the objective optical system and the measurement object in the direction of the optical axis of the objective optical system; and a range setter for setting, based on a result of the position judger, a range for allowing the relative movement.

17. A three-dimensional shape measuring apparatus comprising:

a first measuring system;

a second measuring system;

a first controller for controlling the first measuring system to obtain first positional data about a measurement object;

a measurement region calculator for calculating a measurement region based on obtained first positional data; and a second controller for controlling the second measuring system to obtain second positional data of the measurement object within the calculated measurement region.

18. A three-dimensional shape measuring apparatus according to claim 17, wherein the first positional data has a lower measurement accuracy than the second positional data.

19. A three-dimensional shape measuring apparatus according to claim 17, wherein the first measuring system has an objective lens which commonly serves as an objective lens of the second measuring system.

20. A three-dimensional shape measuring apparatus according to claim 17, wherein:

the first measuring system measures a position of an outer surface of the measurement object by trigonometric measuring method; and the second measuring system has an objective lens and measures a position of a surface of the measurement object by a relative movement between the focus of the objective lens and the measurement object in an optical axis of the objective lens.

21. A three-dimensional shape measuring apparatus according to claim 17, wherein the first and second measuring systems have different coordinate systems for their respective measurements, and the first controller transforms the coordinate system of the first positional data into the coordinate system of the second measuring system, and the measurement region calculator calculates a measurement region based on a coordinate-transformed first positional data.

22. A method for measuring a three-dimensional shape of an object, comprising the steps of:

obtaining first positional data of an object at a first measurement accuracy;

determining a measurement region based on the obtained first positional data;

obtaining second positional data of the object within the determined measurement region at a second measurement accuracy, the second measurement accuracy being higher than the first measurement accuracy; and calculating a three-dimensional shape based on the second positional data.

* * * * *